(12) United States Patent
Fujii et al.

(10) Patent No.: US 6,479,568 B1
(45) Date of Patent: Nov. 12, 2002

(54) NON-AQUEOUS BALL POINT PEN INK AND BALL POINT PEN USING THE INK

(75) Inventors: Takeshi Fujii, Gunma (JP); Kahori Funabashi, Gunma (JP); Teruaki Fukasawa, Gunma (JP)

(73) Assignee: Kabushiki Kaisha Pilot, Tokyo (JP)

( * ) Notice: Subject to any disclaimer, the term of this patent is extended or adjusted under 35 U.S.C. 154(b) by 72 days.

(21) Appl. No.: 09/708,462

(22) Filed: Nov. 9, 2000

(30) Foreign Application Priority Data

Nov. 18, 1999 (JP) .......................................... 11-365206

(51) Int. Cl.⁷ .......................... C09D 11/18; C08L 39/06
(52) U.S. Cl. ...................... 523/161; 524/516; 525/205
(58) Field of Search ................................ 523/160, 161; 524/516; 525/203, 205, 279, 283, 419

(56) References Cited

U.S. PATENT DOCUMENTS

| | | | | |
|---|---|---|---|---|
| 4,726,845 A | * | 2/1988 | Thompson et al. | 106/31.68 |
| 5,769,931 A | * | 6/1998 | Wang et al. | 106/31.38 |
| 5,929,135 A | * | 7/1999 | Wasai et al. | 523/161 |
| 6,066,689 A | * | 5/2000 | Columbus et al. | 524/322 |

FOREIGN PATENT DOCUMENTS

| | | | |
|---|---|---|---|
| EP | 0 702 066 | | 3/1996 |
| EP | 0 806 461 | | 11/1997 |
| JP | 03019897 | * | 1/1991 |
| JP | 08311388 | * | 11/1996 |
| JP | 09302298 | * | 11/1997 |
| JP | 11310743 | * | 11/1999 |
| WO | 97/40110 | | 10/1997 |

* cited by examiner

*Primary Examiner*—Vasu Jagannathan
*Assistant Examiner*—Callie E. Shosho
(74) *Attorney, Agent, or Firm*—Rader, Fishman & Grauer PLLC

(57) ABSTRACT

A non-aqueous ball point pen ink and a ball point pen using this ink contains a colorant, an organic solvent, a non-Newtonian viscosity imparting agent, and 0.4 to 0.8 mass % in total of 0.2 to 0.6 mass % of polyvinyl pyrrolidone with a weight-average molecular weight of about 1,000,000 to 1,500,000 and 0.1 to 0.4 mass % of polyvinyl pyrrolidone with the weight-average molecular weight of about 2,500,000 to 3,000,000. By means of this invention, feathering and blobbing of ink are eliminated, ink leakage is prevented, and a satisfactory writing smoothness of a ball-point pen is obtained.

8 Claims, No Drawings

NON-AQUEOUS BALL POINT PEN INK AND BALL POINT PEN USING THE INK

FIELD OF THE INVENTION

The present invention relates to a non-aqueous ball point pen ink and a ball point pen using the ink. Specifically, the present invention relates to a non-aqueous ink provided with pseudoplasticity. The ink is provided by blending a non-Newtonian viscosity imparting and is provided with viscoelasticity by blending two types of polyvinyl pyrrolidone having different weight-average molecular weights to eliminate ink blobbing and scratching, and to a non-aqueous ball point pen using this ink.

BACKGROUND OF THE INVENTION

A conventional non-aqueous ball point pen has been designed by setting an ink viscosity in a range of 10,000 to 30,000 mPa·s (20° C.) to prevent leakage. However, when the viscosity during writing is high in this manner, the ball rotation resistance during writing automatically increases and writing smoothness was very low and fails to be satisfactory. Moreover, a high writing pressure was necessary during writing. In some cases, a load of 500 gf or more was applied to a pen point. The heavy load causes the pen point to be quickly damaged. Furthermore, ball breakage and writing defects frequently could occur as a consequence. On the other hand, as disclosed in Japanese Patent Application Laid-Open No. 6-313143 (1994), 6-313144 (1994), 7-196972 (1995) or 9-48941 (1997), attempts were carried out to improve the above-described defects by creating inks having a pseudoplasticity viscosity property, where the ink viscosity is low when writing and where the ink viscosity is relatively high when writing is not performed. However, the attempts were not sufficient in enhancing the writing smoothness and completely preventing the leakage.

SUMMARY OF THE INVENTION

The present invention provides an ink which realizes a remarkably satisfactory writing smoothness, eliminates blobbing and feathering and which can completely prevent leakage, and further provides a non-aqueous ball point pen in which during ink transport by way of writing, no ink adheres to an ink reserving tube inner wall and an ink residual amount is clear. "Blobbing" is a phenomenon in which a surplus ink during writing is accumulated in a pen point. "Feathering" is blurring of the ink due to absorption by paper etc.

The present invention relates to a non-aqueous ball point pen ink which contains, as main components, a colorant, an organic solvent, a non-Newtonian viscosity imparting agent, and a total of 0.4 to 0.8 mass % of polyvinyl pyrrolidone, where 0.2 to 0.6 mass % of polyvinyl pyrrolidone has a weight-average molecular weight of about 1,000,000 to 1,500,000 and 0.1 to 0.4 mass % of polyvinyl pyrrolidone with a weight-average molecular weight of about 2,500,000 to 3,000,000. A non-Newtonian viscosity index of the ink may be in a range of 0.4 to 0.7, a viscosity in a shearing speed of 500 $sec^{-1}$ is in a range of 3,000 to 6,000 mPa·s (20° C.), and the viscosity in the shearing speed of 0.19 $sec^{-1}$ may be in a range of 20,000 to 60,000 mPa·s (20° C.). The non-Newtonian viscosity imparting agent may be a fatty acid amide wax with a melting temperature of 140° C. or more. The non-Newtonian viscosity imparting agent may be fatty acid amide wax. The blend amount of the fatty acid amide wax may be in a range of 1.0 to 2.0 mass %.

The non-aqueous ink above can be directly filled into an ink reserving tube of a ball point pen. The ink reserving tube can be a polypropylene tube. An inner wall of the ink reserving tube can be treated with silicone.

PREFERRED EMBODIMENT OF THE INVENTION

According to the present invention, there is provided an ink in which an ink viscosity in a shearing speed of 500 $sec^{-1}$ can preferably be in a range of 3,000 to 6,000 mPa·s. When the ink viscosity is less than 3,000 mPa·s, writing smoothness is satisfactory but drawn line blobbing can be remarkable, further feathering can be unsatisfactory, even though it is still acceptable. Moreover, when the viscosity exceeds 6,000 mPa·s, a low writing pressure and smooth stroke as the object of the present invention can be hardly embodied, even though it is still acceptable.

As a result of intensive studies on the writing stroke of a ball point pen, the present inventors found that the stroke largely depends on the ball rotation resistance during writing. As a result of experiments, when the ink viscosity in the shearing speed of 500 $sec^{-1}$ is less than 1,000 mPa·s, the ball rotation resistance is remarkably reduced, but a boundary lubrication area is constituted without forming an ink oil film between a ball and a ball seat and the intrinsic smoothness of the non-aqueous ball point pen is deteriorated. Moreover, when the viscosity exceeds 10,000 mPa·s, the ball rotation resistance tends to increase and the stroke obviously tends to become heavy. Specifically, when the ink viscosity is in a range of 1,000 to 10,000 mPa·s, the stroke becomes satisfactory. However, to prevent feathering and blobbing, and embody the intrinsic deep drawn line of the non-aqueous ball point pen, the ink viscosity should preferably be 3,000 mPa·s or more at minimum. Furthermore, not only to pursue touch smoothness, but also to enable a low pressure writing of about 100 gf like an aqueous ball point pen, the ink viscosity should preferably be 6,000 mPa·s or less. The ink viscosity described herein was measured in a measurement environment of 20° C. using a rheometer CSL manufactured by British Carrymay, Ltd.

Moreover, in the present invention, a non-Newtonian viscosity imparting agent is blended into an ink composition, and an ink non-Newtonian viscosity index is set to 0.4 to 0.7. As described above, to obtain the satisfactory stroke, the ink viscosity during writing, that is, during high shearing is set to be low. A likelihood of occurrence of leakage necessarily increases, and this cannot be prevented by a conventional ink design. To prevent this defect, pseudoplasticity is set as an ink viscosity property by containing the non-Newtonian viscosity imparting agent in the ink composition, and the ink viscosity when the ball point pen is not being used is set to be as high as possible. Moreover, adequate consideration was given also to the drawn line blobbing in the study of the ink viscosity, but it is also a fact that the drawn line blobbing is in an increase direction when the viscosity is set to be low. It is particularly mentioned that when the pseudoplasticity is set as the ink viscosity property, the cohesive force of the ink itself increases, the generation of a surplus ink in a pen point is reduced and an effect of eliminating the blobbing is brought about. When the non-Newtonian viscosity index is less than 0.4, the cohesive force of the ink itself excessively increases, an ink follow-up defect is caused, and a phenomenon of discontinuity, line cut and non-uniformity in line darkness ("scratching"). On the other hand, when the index exceeds 0.7, the cohesive force decreases and the effect of preventing the blobbing is weakened.

The non-Newtonian viscosity imparting agent for use in the non-aqueous ink includes a fatty acid amide wax and a derivative thereof, linear chain fatty acid ester polymer, polyethylene oxide, hardened castor oil, organic bentonite, silica, sulfate-based anion activator, and the like, but the fatty acid amide wax is preferable considering from stability. Further considering from the stability during the high-temperature preservation of the ball point pen, it is most preferable to select the fatty acid amide wax with a melting temperature of 140° C. or more as the non-Newtonian viscosity imparting agent. The amount of the fatty acid amide wax is in a range of 1.0 to 2.0 mass % in order to realize the non-Newtonian viscosity index of 0.4 to 0.7. The non-Newtonian viscosity index described herein was measured using the rheometer CSL manufactured by British Carrymay, Ltd. in a measurement environment of 20° C. with appropriate values of angle and diameter of a cone plate in a shearing speed range of 1 to 600 $sec^{-1}$.

Furthermore, in the present invention, the viscosity in a shearing speed of 0.19 $sec^{-1}$ was set to a range of 20,000 to 60,000 mPa·s. By providing the ink viscosity property with the pseudoplasticity, the leakage could be minimized, but the ink viscosity during writing needs to be set to be low to obtain a satisfactory stroke, and it was therefore difficult to completely prevent the leakage of various ball point pen inks only by imparting the pseudoplasticity. The inventors have found that the viscosity in the shearing speed of 0.19 $sec^{-1}$ needed to be 20,000 mPa·s or more to completely prevent the leakage, even though the viscosity lower than that amount was still acceptable. Moreover, when the viscosity in the shearing speed of 0.19 $sec^{-1}$ exceeds 60,000 mPa·s, the ink fluidity tended to be lowered, the ink follow-up property during writing tended to be deteriorated, and the ink became inappropriate as a writing utensil ink. Examples of an ink viscosity adjuster include phenol resin, amide resin, xylene resin, hydro-rosin resin, ketone resin, and the like, and the adjuster is also effective as a fixer of a drawn line to a paper surface. The ink viscosity described herein was also measured using the rheometer CSL manufactured by British Carrymay, Ltd. in the measurement environment of 20° C. The present invention realizes a remarkably smooth touch, embodies a non-aqueous ball point pen ink with which the low pressure writing is possible like the aqueous ball point pen, and provides an ink sufficient for simultaneously preventing the blobbing and leakage. Specifically, the ink viscosity in the shearing speed of 500 $sec^{-1}$ is set to a range of 3,000 to 6,000 mPa·s (20° C.) in order to obtain a satisfactory touch, and the ink viscosity property is provided with the pseudoplasticity in order to completely prevent the feathering and blobbing which would normally tend to increase because of the low ink viscosity setting. Furthermore, in order to satisfy the ink leakage preventing performance and ink follow-up property which become insufficient when the ink is applied to various ball point pens, the viscosity in the shearing speed of 0.19 $sec^{-1}$ is set to a range of 20,000 to 60,000 mPa·s (20° C.).

Furthermore, the inventors thoroughly analyzed the relation between scratching and blobbing to embody a remarkably superior ball point pen performance. In the conventional non-aqueous ball point pen, a deep drawn line is obtained by interposing a pen point ball and transferring an ink film to a paper surface. In this case, as described above, the generation of the surplus ink, that is, the blobbing is prevented by the favorable viscoelasticity of the ink itself. On the other hand, when the viscoelasticity is too strong, the ink follow-up defect is caused as described above, and no smooth ink film can be formed on the pen point ball surface. This phenomenon is a scratching phenomenon. Specifically, the blobbing performance is a phenomenon contrary to scratching, and it is remarkably difficult to simultaneously enhance both performances.

The inventors empirically found that this difficult problem could be solved by simultaneously using resins having different properties in the ink components. It is necessary to provide the ink performance with viscoelasticity and select the resin which fails to deteriorate the ink stability, and polyvinyl pyrrolidone is optimum. Although the resins need to be different in properties as described above, there is a danger that completely different types of resins react in the ink. In this respect, for polyvinyl pyrrolidone, various grades different in molecular weights are extensively known and polyvinyl pyrrolidone can safely be employed in the ink. When polyvinyl pyrrolidone with a weight-average molecular weight of about 1,000,000 to 1,500,000 is added, the viscoelastic action is slightly insufficient, but the smooth ink film can easily be formed on the pen point ball surface, and a stable drawn line can be realized. Moreover, polyvinyl pyrrolidone with a weight-average molecular weight of about 2,500,000 to 3,000,000 provides a remarkably high viscoelasticity, and is effective for preventing the blobbing. By simultaneously using polyvinyl pyrrolidone compounds having different in properties, both the blobbing and scratching performances contrary to each other are enhanced.

The effect of polyvinyl pyrrolidone as the additive for providing the ink with the viscoelasticity has been reported, but the action of effectively facilitating the forming of the ink film with respect to the pen point ball is not known.

The total addition amount of polyvinyl pyrrolidone needs to be in a range of 0.4 to 0.8 mass % with respect to the total ink composition. When the amount is less than 0.4 mass %, the ink can be deficient in its viscoelasticity and the blobbing performance can hardly be sufficient. Moreover, when the amount exceeds 0.8 mass %, the viscoelasticity can be too strong, and scratching can result. For the blend ratio of polyvinyl pyrrolidone, an empirically obtained combination of 0.2 to 0.6 mass % of polyvinyl pyrrolidone with a weight-average molecular weight of about 1,000,000 to 1,500,000 and 0.1 to 0.4 mass % of polyvinyl pyrrolidone with a weight-average molecular weight of about 2,500,000 to 3,000,000 is most effective.

When the blend amount of polyvinyl pyrrolidone with the weight-average molecular weight of about 1,000,000 to 1,500,000 is less than 0.2 mass %, or when the blend amount of polyvinyl pyrrolidone with the weight-average molecular weight of about 2,500,000 to 3,000,000 is less than 0.1 mass %, the ink is deficient in its viscoelasticity and the blobbing performance cannot be enhanced. Moreover, when the blend amount of polyvinyl pyrrolidone with the weight-average molecular weight of about 1,000,000 to 1,500,000 exceeds 0.6 mass %, or when the blend amount of polyvinyl pyrrolidone with the weight-average molecular weight of about 2,500,000 to 3,000,000 exceeds 0.4 mass %, the viscoelasticity is too strong, and scratching results. The total blend amount of polyvinyl pyrrolidone needs to be in a range of 0.4 to 0.8 mass % with respect to the total ink composition. With the amount of less than 0.4 mass %, even when polyvinyl pyrrolidone with the weight-average molecular weight of 2,500,000 to 3,000,000 is used, the ink can be deficient in its viscoelasticity and the blobbing performance cannot be enhanced.

As polyvinyl pyrrolidone with the weight-average molecular weight of about 1,000,000 to 1,500,000, PVP K-90 (manufactured by GAF, Ltd., weight-average molecular weight of 1,280,000) is exemplified, and as polyvinyl pyrrolidone with the weight-average molecular weight of about 2,500,000 to 3,000,000, PVP K-120 (manufactured by GAF, Ltd., weight-average molecular weight of 2,800,000) is exemplified.

A colorant as the essential component of the present invention can be used without being particularly limited to the dye or pigment heretofore employed in the non-aqueous ball point pen. Examples of the pigment include organic, inorganic and processed pigments, such as carbon black, phthalocyanine, azo, quinacridone, anthraquinone, and indigo pigments. Moreover, as the dye, an alcohol-soluble dye, oil-soluble dye, direct dye, acid dye, basic dye, metallized dye, and various salt-forming type dyes can be employed. Moreover, these can be used alone or as a mixture. The blend proportion is preferably in a range of 5 to 50 mass % with respect to the total ink composition.

The organic solvent for use in the present invention is used as an ink composition solvent, or dispersing medium. Concretely, alcohol and glycol solvents such as benzyl alcohol, propylene glycol and butylene glycol, Cellosolve solvents such as phenyl Cellosolve, Carbitol solvents such as phenyl Carbitol, and nitrogen-containing solvents such as N-methyl pyrrolidone can be used alone or as a mixture. The blend proportion is preferably in a range of 30 to 70 mass % with respect to the total ink composition.

Here, a ball point pen structure will be described. For an ink reserving tube for the non-aqueous ball point pen, usable materials are limited from the standpoints of chemical resistance, moisture permeability, air permeability, and the like. In this respect, it has heretofore been most general to use polypropylene as the material. However, in the present invention particularly when the fatty acid amide wax is selected as the non-Newtonian viscosity imparting agent, the fatty acid amide wax has a very strong affinity for polypropylene. Therefore, when the ink is transferred from the ink reserving tube, a defect is generated that the ink adheres to the inner wall and the ink residual amount fails to be clarified. As a countermeasure against the defect, the present inventors have found that when the ink reserving tube is formed of polypropylene, the ink reserving tube inner wall is to be treated with silicone. When silicone is applied to the ink reserving tube inner wall, polypropylene as the reserving tube material does not directly contact the ink and keeps a relation that silicone is interposed, so that during the movement of the ink, the prevention of adherence to the reserving tube inner wall is embodied. As a silicone material, TSF-4420 (Toshiba Silicone Co., Ltd.) is exemplified. It is a most effective application method to simultaneously and uniformly apply silicone to the inner wall during extrusion molding.

When a tube of polyethylene terephthalate or nylon is used as the ink reserving tube, the application of silicone is not necessarily required.

EXAMPLES

Examples will next be described concretely.

Example 1

| | |
|---|---|
| NIGROSINE EX | 15.0 mass % |
| VALIFAST VIOLET 1701 | 15.0 mass % |
| phenyl glycol | 52.1 mass % |
| benzyl alcohol | 13.0 mass % |
| fatty acid amide wax | 2.5 mass % |
| polyvinyl pyrrolidone K-90 | 0.2 mass % |

-continued

| | |
|---|---|
| polyvinyl pyrrolidone K-120 | 0.2 mass % |
| viscosity adjustment resin | 2.0 mass % |

By mixing, then heating at 60° C. and stirring the above-described components, dissolving dyes and resin, and uniformly dispersing the fatty acid amide wax in the ink, a black non-aqueous ball point pen ink was obtained. NIGROSINE EX, and VALIFAST VIOLET 1701 (both are dyes manufactured by Orient Kagaku Kogyo K. K.) were used as the dyes to adjust a color in black. For the fatty acid amide wax, as the non-Newtonian viscosity imparting agent, TAREN 7200 (manufactured by Kyoeisha Kagaku K. K.) was employed. As a viscosity adjuster and a drawn line adjuster, polyvinyl pyrrolidone K-90 (manufactured by GAF Co., Ltd., weight-average molecular weight of 1,280,000), and polyvinyl pyrrolidone K-120 (manufactured by GAF Co., Ltd., weight-average molecular weight of 2,800,000) were employed. As the viscosity adjustment resin, HIRACK 110H (manufactured by Hitachi Chemical Co., Ltd., ketone resin) was employed. Here, by directly inserting the obtained black non-aqueous ball point pen ink into the polypropylene reserving tube with the inner wall treated by silicone (TSF-4420 manufactured by Toshiba Silicone Co., Ltd.), and mounting the ink reserving tube in a shaft cylinder, the non-aqueous ball point pen was formed.

Examples 2 to 11

The non-aqueous ball point pen was formed similarly as the example 1 except that the ink composition shown in Table 1 was used.

Comparative Examples 1 to 19

The non-aqueous ball point pen was formed similarly as the example 1 except that the ink compositions shown in Tables 2 and 3 were used.

(Note) Polyvinyl pyrrolidone K-30 manufactured by GAF Co. Ltd. with a weight-average molecular weight of 55,000 was used.

Test And Evaluation

With respect to the respective non-aqueous ball point pens of the examples 1 to 11 and comparative examples 1 to 19, the following test and evaluation were performed.

1. Writing smoothness: Evaluation by manual writing

Low pressure writing is possible to such an extent that writing is possible with a ball point pen weight, smooth and particularly satisfactory . . . ⊚

Satisfactory . . . ○

Slightly inferior . . . Δ

Low pressure writing is impossible, and no smooth touch . . . ×

2. Drawn line scratching: Evaluation by manual writing

Not generated and remarkably satisfactory . . . ⊚

Unnoticeable degree in practical use . . . ○

Slightly noticeable . . . Δ

Very noticeable . . . ×

3. Drawn line blobbing: By setting a writing load to 200 gf and a writing angle to 65°, and using a writing tester for spiral writing at a writing speed of 4 m/min., the state after the writing of 100 m was confirmed.

No blobbing in drawn line, no drop (ink rising) in pen point . . . ⊚

Less than one blob in drawn line, drop very slightly generated . . . ○

One to five blobs in drawn line, drop slightly generated . . . Δ

Five or more blobs in drawn line, drop remarkably generated . . . ×

4. Feathering: After writing characters on a writing sheet A in an environment of 30° C. and 60%RH and leaving a written sheet surface to stand in the similar environment for 24 hours, the feathering was checked.

No feathering in drawn line . . . ⊚

Almost no feathering . . . ○

Slight feathering . . . Δ

Remarkable feathering . . . ×

5. Leakage: After leaving the ball point pen to vertically stand in an environment of 40° C. and 95%RH with a chip facing downward for 24 hours, the leakage from the pen point was checked.

No leakage from pen point confirmed . . . ⊚

Almost no leakage from pen point confirmed . . . ○

No ink rising confirmed up to ¼ of chip taper part . . . Δ

Ink rising by ¼ of chip taper part or more . . . ×

The evaluation results of the respective examples and comparative examples are shown in Tables 1, 2 and 3.

TABLE 1

| | | Example 1 | Example 2 | Example 3 | Example 4 | Example 5 | Example 6 |
|---|---|---|---|---|---|---|---|
| Ink blend | Nigrosine EX | 15.0 | 15.0 | 15.0 | 15.0 | 15.0 | 15.0 |
| | Valifast violet 1701 | 15.0 | 15.0 | 15.0 | 15.0 | 15.0 | 15.0 |
| | Phenyl glycol | 52.1 | 52.2 | 37.2 | 49.5 | 50.0 | 52.3 |
| | Benzyl alcohol | 13.0 | 13.0 | 24.8 | 12.4 | 12.5 | 13.0 |
| | Fatty acid amide wax | 2.5 | 2.0 | 2.5 | 2.5 | 3.0 | 2.0 |
| | Polyvinyl pyrrolidone K-90 | 0.2 | 0.6 | 0.4 | 0.2 | 0.2 | 0.6 |
| | Polyvinyl pyrrolidone K-120 | 0.2 | 0.2 | 0.1 | 0.4 | 0.3 | 0.1 |
| | Viscosity adjustment resin | 2.0 | 2.0 | 5.0 | 5.0 | 4.0 | 2.0 |
| Ink physical properties | Non-Newtonian viscosity index | 0.43 | 0.64 | 0.53 | 0.48 | 0.43 | 0.52 |
| | Ink viscosity (at. 20° C., 500 sec$^{-1}$) | 3000 | 5000 | 4000 | 4400 | 3950 | 3400 |
| | Ink viscosity (at. 20° C., 0.19 sec$^{-1}$) | 36250 | 40000 | 34000 | 52500 | 59000 | 34500 |
| Ball point pen performance | Smoothness | ⊚ | ⊚ | ⊚ | ○ | ○ | ⊚ |
| | Scratching | ⊚ | ⊚ | ⊚ | ○ | ○ | ⊚ |
| | Blobbing | ○ | ⊚ | ○ | ⊚ | ⊚ | ○ |
| | Feathering | ⊚ | ⊚ | ⊚ | ⊚ | ⊚ | ⊚ |
| | Leakage | ⊚ | ⊚ | ○ | ⊚ | ⊚ | ⊚ |

| | | Example 7 | Example 8 | Example 9 | Example 10 | Example 11 |
|---|---|---|---|---|---|---|
| Ink blend | Nigrosine EX | 15.0 | 15.0 | 15.0 | 15.0 | 15.0 |
| | Valifast violet 1701 | 15.0 | 15.0 | 15.0 | 15.0 | 15.0 |
| | Phenyl glycol | 50.8 | 49.5 | 51.6 | 50.6 | 51.7 |
| | Benzyl alcohol | 12.7 | 12.4 | 12.9 | 12.7 | 13.1 |
| | Fatty acid amide wax | 3.0 | 1.5 | 2.0 | 2.0 | 1.7 |
| | Polyvinyl pyrrolidone K-90 | 0.4 | 0.5 | 0.4 | 0.5 | 0.3 |
| | Polyvinyl pyrrolidone K-120 | 0.1 | 0.1 | 0.1 | 0.2 | 0.2 |
| | Viscosity adjustment resin | 3.0 | 6.0 | 3.0 | 4.0 | 3.0 |
| Ink physical properties | Non-Newtonian viscosity index | 0.4 | 0.7 | 0.45 | 0.67 | 0.67 |
| | Ink viscosity (at. 20° C., 500 sec$^{-1}$) | 3200 | 5800 | 3000 | 6000 | 3500 |
| | Ink viscosity (at. 20° C., 0.19 sec$^{-1}$) | 40000 | 30000 | 33000 | 35000 | 20000 |
| Ball point pen performance | Smoothness | ⊚ | ⊚ | ⊚ | ○ | ⊚ |
| | Scratching | ⊚ | ⊚ | ⊚ | ○ | ⊚ |
| | Blobbing | ○ | ○ | ○ | ⊚ | ○ |
| | Feathering | ⊚ | ⊚ | ⊚ | ⊚ | ⊚ |
| | Leakage | ⊚ | ○ | ⊚ | ○ | ○ |

TABLE 2

| | | Comparative example 1 | Comparative example 2 | Comparative example 3 | Comparative example 4 | Comparative example 5 | Comparative example 6 | Comparative example 7 |
|---|---|---|---|---|---|---|---|---|
| Ink blend | Nigrosine EX | 15.0 | 15.0 | 15.0 | 15.0 | 15.0 | 15.0 | 15.0 |
| | Valifast violet 1701 | 15.0 | 15.0 | 15.0 | 15.0 | 15.0 | 15.0 | 15.0 |
| | Phenyl glycol | 50.4 | 51.8 | 49.3 | 50.6 | 51.4 | 49.4 | 52.2 |
| | Benzyl alcohol | 12.6 | 12.9 | 12.3 | 12.7 | 12.8 | 12.3 | 13.0 |
| | Fatty acid amide wax | 2.5 | 2.5 | 2.7 | 2.5 | 2.2 | 3.0 | 2.0 |
| | Polyvinyl pyrrolidone K-90 | 0.1 | 0.7 | 0.6 | 0.2 | 0.1 | 0.2 | 0.7 |
| | Polyvinyl pyrrolidone K-120 | 0.4 | 0.1 | 0.05 | 0.5 | 0.5 | 0.1 | 0.05 |

TABLE 2-continued

| | | | | | | | | |
|---|---|---|---|---|---|---|---|---|
| Ink physical properties | Viscosity adjustment resin | 4.0 | 2.0 | 5.05 | 3.5 | 3.0 | 5.0 | 2.05 |
| | Non-Newtonian viscosity index | 0.52 | 0.53 | 0.50 | 0.48 | 0.46 | 0.42 | 0.66 |
| | Ink viscosity (at. 20° C., 500 sec$^{-1}$) | 4000 | 4300 | 5500 | 4500 | 3800 | 3100 | 5000 |
| | Ink viscosity (at. 20° C., 0.19 sec$^{-1}$) | 35000 | 35000 | 48750 | 53000 | 45000 | 41000 | 34000 |
| Ball point pen performance | Smoothness | x | x | x | x | x | x | x |
| | Scratching | x | x | ○ | x | x | Δ | x |
| | Blobbing | ○ | x | x | ⊙ | ⊙ | x | x |
| | Leakage | ⊙ | ⊙ | ⊙ | ⊙ | ⊙ | ⊙ | ○ |

| | | Comparative example | | | | | |
|---|---|---|---|---|---|---|---|
| | | 8 | 9 | 10 | 11 | 12 | 13 |
| Ink blend | Nigrosine EX | 15.0 | 15.0 | 15.0 | 15.0 | 15.0 | 15.0 |
| | Valifast violet 1701 | 15.0 | 15.0 | 15.0 | 15.0 | 15.0 | 15.0 |
| | Phenyl glycol | 51.7 | 50.9 | 47.3 | 52.5 | 48.1 | 52.5 |
| | Benzyl alcohol | 12.9 | 12.7 | 11.8 | 13.1 | 12.0 | 12.4 |
| | Fatty acid amide wax | 1.5 | 4.0 | 1.5 | 2.3 | 2.0 | 1.7 |
| | Polyvinyl pyrrolidone K-90 | 0.5 | 0.2 | 0.2 | 0.2 | 0.2 | 0.2 |
| | Polyvinyl pyrrolidone K-120 | 0.4 | 0.2 | 0.2 | 0.2 | 0.2 | 0.2 |
| | Viscosity adjustment resin | 3.0 | 2.0 | 9.0 | 1.7 | 7.5 | 3.0 |
| Ink physical properties | Non-Newtonian viscosity index | 0.68 | 0.3 | 0.8 | 0.54 | 0.63 | 0.70 |
| | Ink viscosity (at. 20° C., 500 sec$^{-1}$) | 5800 | 3000 | 8000 | 2500 | 6500 | 3000 |
| | Ink viscosity (at. 20° C., 0.19 sec$^{-1}$) | 33000 | 60000 | 30000 | 32500 | 40000 | 18000 |
| Ball point pen performance | Smoothness | x | x | x | x | x | ○ |
| | Scratching | x | x | x | x | x | x |
| | Blobbing | ⊙ | x | x | x | x | x |
| | Leakage | ○ | ⊙ | ○ | ⊙ | ⊙ | x |

TABLE 3

| | | Comparative example | | | | | |
|---|---|---|---|---|---|---|---|
| | | 14 | 15 | 16 | 17 | 18 | 19 |
| Ink blend | nigrosine EX | 15.0 | 15.0 | 15.0 | 15.0 | 15.0 | 15.0 |
| | Valifast violet 1701 | 15.0 | 15.0 | 15.0 | 15.0 | 15.0 | 15.0 |
| | phenyl glycol | 51.9 | 49.3 | 49.2 | 49.7 | 49.2 | 50.3 |
| | benzyl alcohol | 13.0 | 12.3 | 12.3 | 12.4 | 12.3 | 15.1 |
| | fatty acid amide wax | 2.0 | 2.5 | 2.5 | 2.5 | 2.5 | 1.8 |
| | polyvinyl pyrrolidone K-30 | 0.5 | 0.5 | — | — | — | — |
| | polyvinyl pyrrolidone K-90 | 0.6 | — | 1.0 | — | 1.0 | 0.6 |
| | polyvinyl pyrrolidone K-120 | — | 0.4 | — | 0.4 | — | 0.2 |
| | viscosity adjustment resin | 2.0 | 5.0 | 5.0 | 5.0 | 5.0 | 2.0 |
| Ink physical properties | Non-Newtonian viscosity index | 0.64 | 0.48 | 0.48 | 0.46 | 0.47 | 0.52 |
| | Ink viscosity (at. 20° C., 500 sec$^{-1}$) | 5000 | 4400 | 4400 | 3800 | 3000 | 5000 |
| | Ink viscosity (at. 20° C., 0.19 sec$^{-1}$) | 40000 | 52500 | 52500 | 51000 | 48000 | 65000 |
| Ball point pen performance | Smoothness | ⊙ | x | ⊙ | x | x | x |
| | Scratching | x | x | x | x | x | x |
| | Blobbing | x | ⊙ | x | ⊙ | x | x |
| | Leakage | ⊙ | x | ⊙ | ⊙ | ⊙ | ⊙ |

As not described in Tables 1, 2 and 3, for the ball point pens of the respective examples and comparative examples, the ink is transferred from the ink reserving tube with ink consumption by the respective tests. In this case, since no ink adhered to the ink reserving tube inner wall, it was possible to clearly confirm the ink residual amount.

The comparative example 1 is an example in which the addition amount of polyvinyl pyrrolidone K-90 is small. In an attempt to eliminate the drawn line blobbing, slightly much polyvinyl pyrrolidone K-120 was added, writing smoothness became heavy, and additionally the scratchy was generated in the drawn line. When the combination of polyvinyl pyrrolidone is used as in the comparative example 1, no satisfactory ink film is generated in the pen point ball during writing, the ball rotates, the writing smoothness is deteriorated, and scratching results in the drawn line.

The comparative example 2 is an example contrary to the comparative example 1, in which the addition amount of polyvinyl pyrrolidone K-90 is large. In this case, it was obvious from the comparative example 1 that the writing smoothness was deteriorated and scratching resulted unless the amount of polyvinyl pyrrolidone K-120 was reduced, and therefore the addition amount of polyvinyl pyrrolidone K-120 was minimized. However, the writing smoothness failed to be satisfactory and scratching could not be improved. Additionally, the blobbing, which was satisfactory in the comparative example 1, was even generated.

The comparative example 3 is an example in which the addition amount of polyvinyl pyrrolidone K-90 is slightly smaller than that of the comparative example 2, and the addition amount of polyvinyl pyrrolidone K-120 is set to be further lower. Scratching was successfully eliminated, but the writing smoothness and blobbing could not be enhanced.

The comparative examples 4 and 5 are examples in which the addition amount of polyvinyl pyrrolidone K-120 is too large. In this case, even when the ink component is adjusted, the writing smoothness cannot be enhanced, and scratching cannot be improved. This is because the ink viscoelasticity is excessively strong. When the ink viscoelasticity is too strong, the blobbing performance is enhanced, but the smooth and stable ink film cannot be obtained with respect to the ball rotation during writing, an unnecessary ball rotation resistance is thus generated and the touch is not enhanced. Moreover, since a smooth ink transfer cannot be performed on the paper surface during the ball rotation, scratching results in the drawn line.

The comparative example 6 is an example in which the total addition amount of polyvinyl pyrrolidone is basically too small. The ink viscoelasticity is naturally weakened and fierce blobbing occurs during writing. Moreover, since the smooth and stable ink film cannot be obtained with respect to the ball during writing, the stroke is not enhanced, and no stable drawn line can be obtained.

In the comparative example 7, an attempt was made to adjust the combination by adding a large amount of polyvinyl pyrrolidone K-90 and a slightly small amount of polyvinyl pyrrolidone K-120, but the writing smoothness was not enhanced, scratching was not prevented, and the blobbing could not be improved. The result similar to that of the comparative example 2 or 3 was obtained.

The comparative example 8 is an example contrary to the comparative example 6, in which the total addition amount of polyvinyl pyrrolidone is too large. Of course, since the ink viscoelasticity increases, no drawn line blobbing is generated. However, the excessively strong ink viscoelasticity is a natural result, the stroke is deteriorated, and a remarkable scratching is generated.

The comparative example 9 is an example in the non-Newtonian viscosity index is too small. The ink transfer to the paper surface via the ball rotation needs to be embodied in order to obtain a deep drawn line peculiar to the non-aqueous ball point pen, and the ink viscosity in the shearing speed of 500 $sec^{-1}$ (at. 20° C.) needs to be 3,000 mPa·s at minimum as described in the specification. In the present invention, on the assumption that the deep drawn line is to be obtained, the ink viscosity in the shearing speed of 500 $sec^{-1}$ (at. 20° C.) is set to 3,000 mPa·s. Even with this ink viscosity, however, when the non-Newtonian viscosity index is 0.3, no smooth ink film can be obtained in the vicinity of the pen point ball during writing and a satisfactory writing performance cannot be realized.

The comparative example 10 is an example in which the non-Newtonian viscosity index is too large. The ink viscosity in the shearing speed of 0.19 $sec^{-1}$ (at. 20° C.) was first set in order to prevent the leakage as a major defect for the ball point pen. When the non-Newtonian viscosity index is set to be large as 0.8 like in the comparative example 10, the ink viscosity in the shearing speed of 0.19 $sec^{-1}$ (at. 20° C.) needs to be 20,000 mPa·s at minimum in order to prevent the leakage. The ink viscosity in the ink shearing speed of 500 $sec^{-1}$ (at. 20° C.) was measured to be 8,000 mPa·s. As described in the specification, the stroke was not enhanced, and scratching resulted. Moreover, the too large non-Newtonian viscosity index means the deficiency of the ink in its viscoelasticity and results in the generation of the drawn line blobbing.

The comparative example 11 is an example in which the ink viscosity in the shearing speed of 500 $sec^{-1}$ (at. 20° C.) is too low. The deep drawn line and stroke peculiar to the non-aqueous ball point pen cannot be obtained. Moreover, since the ink viscosity is lowered more than necessary by the pen point ball rotation during writing, the drawn line blobbing and scratching occur as a result.

The comparative example 12 is an example in which the ink viscosity in the shearing speed of 500 $sec^{-1}$ (at. 20° C.) is too high. The viscosity is not high as compared with the conventional non-aqueous ball point pen and can be evaluated to be rather low, but the ink of the present invention is a pseudoplastic ink and the viscoelasticity of the ink itself is strong. Additionally, in the present invention, polyvinyl pyrrolidone is adjusted, that is, the ink viscoelasticity is controlled to simultaneously solve both scratching and blobbing performances. Therefore, the ink viscosity in the shearing speed of 500 $sec^{-1}$ (at. 20° C.) is a factor which directly exerts an influence on the writing performance. When this viscosity exceeds 6,000 mPa·s, the ink smoothness is eliminated and the writing performance is not enhanced.

The comparative example 13 is an example in which the ink viscosity in the shearing speed of 0.19 $sec^{-1}$ (at. 20° C.) is low. An experiment was performed by setting the ink viscosity in the shearing speed of 500 $sec^{-1}$ (at. 20° C.) to 3,000 mPa·s in order to obtain the deep drawn line of the non-aqueous ball point pen and confirming the occurrence of the leakage, and it has been found that when the viscosity is below 2,000 mPa·s, the leakage cannot be prevented. Moreover, the ink of the comparative example 13 is weak in its own viscoelasticity and no satisfactory drawn line can be obtained.

The comparative examples 14 to 18 are examples in which the combination of polyvinyl pyrrolidone is changed.

The comparative example 14 is an example in which K-30 with a weight-average molecular weight of 55,000 was employed instead of polyvinyl pyrrolidone K-120.

The comparative example 15 is an example in which K-30 was employed instead of polyvinyl pyrrolidone K-90.

The comparative example 16 is an example in which adjustment was attempted only with K-90 without employing polyvinyl pyrrolidone K-120.

The comparative example 17 is an example in which the adjustment was attempted only with K-120 without employing polyvinyl pyrrolidone K-90.

The comparative example 18 is an example in which the adjustment was attempted only with K-30 without employing polyvinyl pyrrolidone K-120 or K-90.

The viscoelasticity of these inks could not be adjusted and scratching and blobbing could not simultaneously be improved.

The comparative example 19 is an example in which the ink viscosity in the shearing speed of 0.19 $sec^{-1}$ (at. 20° C.) is too high. In this case, the leakage can be prevented, but no smooth ink fluidity is obtained in the pen point, and the satisfactory writing performance could not be realized.

The non-aqueous ball point pen ink and the ink-containing non-aqueous ball point pen of the present invention are characterized in that the writing smoothness is remarkably satisfactory, neither blobbing nor feathering is found, and the leakage can completely be prevented.

Moreover, the fatty acid amide wax is particularly selected as the non-Newtonian viscosity imparting agent, and for the ink reserving tube of polypropylene, the ink reserving tube inner wall surface is treated with silicone, so that no ink adheres to the inner wall surface and therefore the ink residual amount can advantageously be confirmed clearly.

The disclosure of Japanese Patent Application No. 11-365206 filed Nov. 18, 1999, including specification, drawings and claims are herein incorporated by reference in its entirety.

What is claimed is:

1. A non-aqueous ball point pen ink comprising: a colorant; an organic solvent; a non-Newtonian viscosity imparting agent; and a total of 0.4 to 0.8 mass % of polyvinyl pyrrolidone, including in total of 0.2 to 0.6 mass % of a first polyvinyl pyrrolidone with a weight-average molecular weight of about 1,000,000 to 1,500,000 and 0.1 to 0.4 mass % of a second polyvinyl pyrrolidone with a weight-average molecular weight of about 2,500,000 to 3,000,000.

2. The non-aqueous ball point pen ink according to claim 1 wherein a non-Newtonian viscosity index of said ink is in a range of 0.4 to 0.7, a viscosity of said ink in a shearing speed of 500 sec$^{-1}$ is in a range of 3,000 to 6,000 mPa·s at 20° C., and the viscosity of said ink in the shearing speed of 0.19 sec$^{-1}$ is in a range of 20,000 to 60,000 mPa·s at 20° C.

3. The non-aqueous ball point pen ink according to claim 2 wherein the non-Newtonian viscosity imparting agent is a fatty acid amide wax with a melting temperature of 140° C. or more.

4. The non-aqueous ball pint pen ink according to claim 2, wherein the amount of the fatty acid amide wax as the non-Newtonian viscosity imparting agent is in a range of 1.0 to 2.0 mass %.

5. The non-aqueous ball point pen ink according to claim 1 wherein the non-Newtonian viscosity imparting agent is a fatty acid amide wax with a melting temperature of 140° C. or more.

6. The non-aqueous ball pint pen ink according to claim 1 wherein the amount of the fatty acid amide wax as the non-Newtonian viscosity imparting agent is in a range of 1.0 to 2.0 mass %.

7. A ball point pen formed by directly inserting the non-aqueous ball point pen ink according to claim 1 into an ink reserving tube whose inner wall is treated with silicone.

8. The ball point pen according to claim 7 wherein the ink reserving tube is a polypropylene tube with silicone applied to an inner face.

* * * * *